United States Patent [19]

Chen et al.

[11] Patent Number: 5,838,392
[45] Date of Patent: Nov. 17, 1998

[54] ADAPTIVE BLOCK-MATCHING MOTION ESTIMATOR WITH A COMPRESSION ARRAY FOR USE IN A VIDEO CODING SYSTEM

[75] Inventors: Hongyi Chen; Qingming Shu, both of Beijing, China

[73] Assignee: United Microelectronics Corp., Hsin-chu, Taiwan

[21] Appl. No.: 44,570

[22] Filed: Mar. 19, 1998

[51] Int. Cl.$^6$ .................................................. H04N 5/14
[52] U.S. Cl. ......................... 348/699; 248/407; 248/416; 248/700; 248/701
[58] Field of Search .................................... 348/409, 413, 348/414, 415, 416, 419, 700, 701, 401, 390; 382/236, 238; H04N 7/137, 5/14

[56] References Cited

U.S. PATENT DOCUMENTS

| | | | |
|---|---|---|---|
| 5,512,962 | 4/1996 | Homma | 348/699 |
| 5,561,475 | 10/1996 | Jung | 348/699 |
| 5,568,203 | 10/1996 | Lee | 348/699 |
| 5,604,546 | 2/1997 | Iwata | 348/699 |
| 5,608,458 | 3/1997 | Chen et al. | 348/413 |
| 5,636,293 | 6/1997 | Lin et al. | 382/236 |
| 5,652,625 | 7/1997 | Chen et al. | 348/416 |
| 5,659,364 | 8/1997 | Aoki et al. | 348/416 |
| 5,696,836 | 12/1997 | Yoshino et al. | 382/107 |
| 5,719,642 | 2/1998 | Lee | 348/699 |
| 5,748,240 | 5/1998 | Carr et al. | 348/384 |

*Primary Examiner*—Tommy P. Chin
*Assistant Examiner*—Tung T. Vo
*Attorney, Agent, or Firm*—Knobbe, Martens, Olson & Bear, LLP

[57] ABSTRACT

An adaptive block-matching motion estimator for used in a video coding system wherein the adaptive block-matching motion estimator is less in hardware complexity and latency time and is therefore more cost-effective to implement and higher in performance. This adaptive block-matching motion estimator includes a DS array for processing the pixel data of the current image block and the pixel data of the compared image block to thereby obtain a difference vector and a set of weight bits; a compression array having a first output port for outputting a compressed sum vector and a second output port for outputting an associated compressed carry vector, with the difference vector and the set of weight bits from the DS array along with the compressed sum vector and the associated compressed carry vector being taken as the inputs to the compression array; and a complexity-matching (CM) unit for processing the compressed sum vector and the associated compressed carry vector from the compression array to thereby produce the desired motion vector.

8 Claims, 4 Drawing Sheets

ADAPTIVE BLOCK-MATCHING MOTION ESTIMATOR WITH A COMPRESSION ARRAY FOR USE IN A VIDEO CODING SYSTEM

BACKGROUND OF THE INVENTION

1. Field of the Invention

This invention relates to video signal processing techniques, and more particularly, to an adaptive block-matching motion estimator with a compression array for hardware implementation of an adaptive block-matching (adaptive BM, or ABM) algorithm for use in a video coding system to process a set of pixel data from the blocks of each video frame in a video signal so as to produce a motion vector indicative of a shift between the current frame and a compared frame.

2. Description of Related Art

In the application of video image processing technologies in areas such as high definition television (HDTV), video telephones and video conferencing, the use of video signal compression techniques is one of the key factors when system performance and efficiency are considered. A high compression ratio for a video signal can be translated directly into good performance and high signal processing efficiency of the system. In order to obtain a high compression ratio for video signals, so that digital video data can be processed in the system at lower bit rates, an efficient encoding scheme implemented by an encoding system would combine several techniques including, for example, motion compensation digital cosine transform, visual characteristics quantization, Huffman coding, etc.

Motion compensation for video signal processing is a technique by which the video image signals are manipulated in the time domain, based on the statistical characteristics of video signals. In principle, if consecutive video image frames at very short time intervals have their image blocks analyzed, it is frequently found that each of the analyzed image blocks will normally have a relatively small difference in its video characteristics. This characteristics of the video image, which is the primary difference when still image characteristics are compared, defines the underlying principle for many of the video image compression schemes. The motion compensation technique use thus has an important and significant influence over the compression ratio factor for video image compression and encoding systems.

Motion estimation is the basis for motion compensation techniques. Successful implementation of a motion compensation technique relies on the precision, speed and efficiency of the algorithm that implements the technique. Among the various processed developed for implementing the motion estimation technique, block matching is one that is relatively simple and clear to implement most easily in terms of substantial hardware, and as such has been widely utilized in this area. Of block matching algorithms used for implementing motion estimation in video image processing systems, there are at the present stage several known algorithms, which include full search algorithm, three-step search algorithm, cross-search algorithm, orthogonal search algorithm, etc.

Fast block matching algorithms, as represented by the three-step search algorithm employ multiple procedural steps to achieve block image matching. Not all possible image clocks are compared, and therefore computational operations are reduced in number. However, any two consecutive procedural steps must still be performed in sequence, which reduces the possibility of parallel implementation, and therefore, hardware logic, employed for implementing such fast block match algorithms, are required to support extremely high throughput, along with the other requirements of low latency and programmability, and computation logic employing tree architecture becomes the ideal solution for implementing these algorithms.

However, conventional computation logic configurations featuring a tree architecture still require a larger number of processing elements, and time delays in stages of the pipeline are significant enough to limit the clock frequency for processing elements. To examine the reason, a conventional, four-channel tree architecture is taken as an example and briefly described below with reference to the accompanying drawings.

Block matching algorithms make use of the mean values of the absolute error function as the basis for measuring the degree to which matching is achieved. The image block featuring the minimum mean absolute error is the one that matches. Mean absolute error represents the average value obtained by summing all the absolute values of the differences between the respective values of corresponding pixels in the compared and the original image block, and then dividing by the total number of processed pixels. Thus, the hardware architecture utilized to implement these block matching algorithms must at least be capable of handling arithmetic operations including subtraction, obtaining an absolute value, summation, and determining a minimum value.

Various conventional methods are available for block-matching motion estimation. One method utilizes the so-called accumulation tree architecture. By this architecture, a total of $2 \cdot N_{ch}+1$ parallel adders and $\log_2 N_{ch}+3$ pipeline stages are required, where $N_{ch}$ is the number of channels in the video system. In the case of $N_{ch}=4$, a total of 9 parallel adders and 5 pipeline stages are required. This causes the hardware complexity and latency time to be still high, and the performance is poor. Moreover, the burden involved in the computation for block matching is quite enormous. For instance, for a 1024×1024 frame partitioned into a number (64×64) of 16×16 blocks, if the shift limit is W=16, then the computation to obtain each motion vector MV requires a total of 278784 arithmetic operations; and since 4096 motion vectors MV are needed, the total number of arithmetic operations will exceed $10^9$. Various methods have been proposed to solve this problem, such as the hierarchical search algorithm (HSA) and the three-step search algorithm (TSSA). These solutions, however, are still unsatisfactory in that the latency time thereof is still high. There exists, therefore, a need for an improved block-matching motion estimator which is less complex in hardware structure and has a reduced latency time as compared to the prior art.

SUMMARY OF THE INVENTION

It is therefore an objective of the present invention to provide an adaptive block-matching motion estimator, which is less complex in hardware architecture as compared to the prior art.

It is another an objective of the present invention to provide an adaptive block-matching motion estimator, which has a smaller latency time as compared to the prior art so as to provide a higher performance.

In accordance with the foregoing and other objectives of the present invention, an adaptive block-matching motion estimator is provided. The adaptive block-matching motion estimator of the invention includes the following constituent elements:

a data-substraction DS array including a plurality of DS units for processing the pixel data of the current image block and the pixel data of the compared image block to thereby obtain a difference vector and a set of weight bits;

a compression array coupled to the DS array, the compression array having a first output port for outputting a compressed sum vector and a second output port for outputting an associated compressed carry vector, with the difference vector and the set of weight bits from the DS array along with the compressed sum vector and the associated compressed carry vector being taken as the inputs to the compression array; and a CM unit, coupled to the compression array, for processing the compressed sum vector and the associated compressed carry vector from the compression array to thereby produce the desired motion vector.

In terms of performance, latency time, hardware complexity, computation burden, and cost-effectiveness, the invention is all more advantageous than the prior art. The computation burden (number of arithmetic operations) can be reduced to only about ¼ to ½ of the prior art.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The adaptive block-matching motion estimator of the invention is used to implement a block-matching motion estimation algorithm based on the following equations:

$$MAE(k,l) = \sum_{i=1}^{N} \sum_{j=1}^{N} |X(i,j) - Y(i+k, j+l)| \quad (1)$$

$$MV = (k,l) |_{\min MAE(k,l)} \quad (2)$$

wherein $-W \leq k, 1 \leq W$, W is a preset shift limit;

MAE is the mean absolute error of (k, 1);

X is the pixel data in the original image block, $X = \{x_{n-1}, x_{n-2}, \ldots, x_0\}$;

Y is the pixel data in the compared image block, $Y = \{y_{n-1}, y_{n-2}, \ldots, y_0\}$;

(k, 1) represents the shift of the compared image block with respect to the original one; and MV represents the motion vector.

To simplify the description and drawings, the following preferred embodiment of the invention will be given for the case of $N_{th} = 4$ (four channels) and a pixel dimension of 8 bits.

Figure 1:
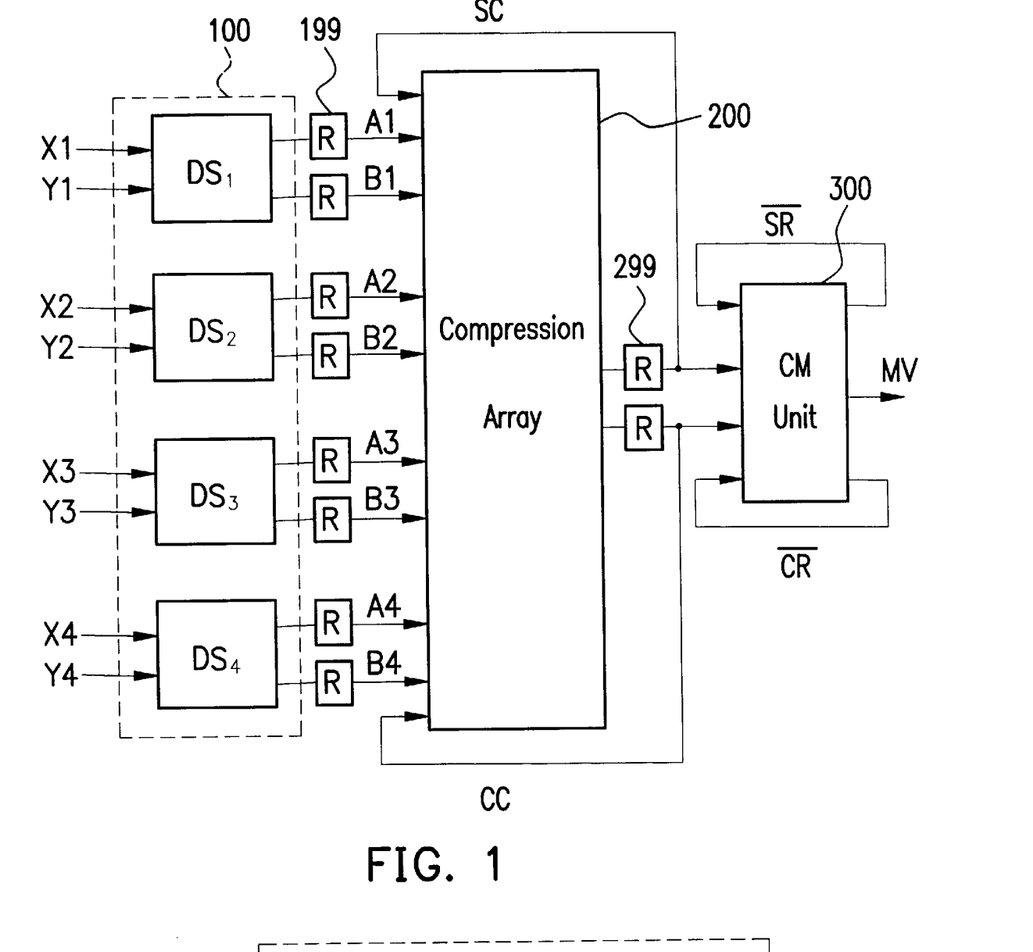
FIG. 1 is a schematic block diagram of the adaptive block-matching motion estimator according to the invention.

Referring to FIG. 1, the adaptive block-matching motion estimator of the invention includes an array of DS units 100 (in the case of a four-channel system $N_{th} = 4$, there are a corresponding number of DS units: $DS_1$, $DS_2$, $DS_3$, $DS_4$ in the DS array 100); a register buffer array 199 for the output of the DS array 100; a compression array 200 coupled to the DS array 100; a register buffer array 299 for the output of the compression array 200; and a complexity-matching (CM) unit 300 coupled to the compression array 200.

Figure 2:
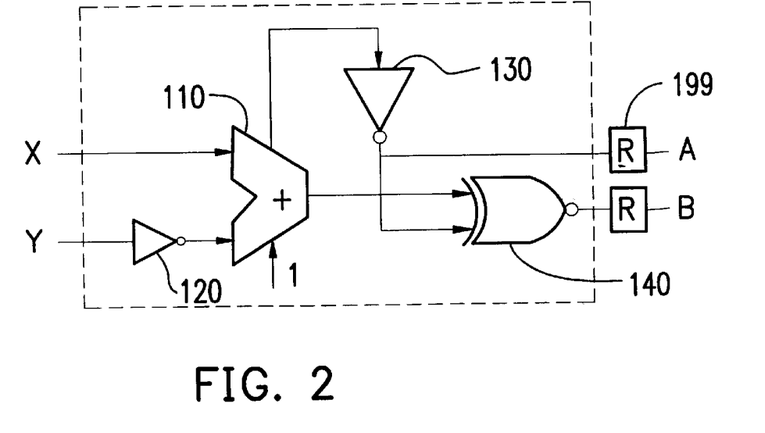
FIG. 2 is a schematic circuit diagram showing the inside structure of each DS unit utilized in the block-matching motion estimator of FIG. 1.

The DS units $DS_1$, $DS_2$, $DS_3$, $DS_4$ in the DS array 100 are respectively used to receive the pixel data sets (X1, Y1), (X2, Y2), (X3, Y3), and (X4, Y4). The output data from $DS_1$, $DS_2$, $DS_3$, $DS_4$ are respectively denoted by (A1, B1), (A2, B2), (A3, B3), and (A4, B4), where A1–A4 are each an 8-bit vector (in the case of 8-bit coding) and B1–B4 are each a single bit. Assume the 8-bit vectors A1–A4 are represented by the following:

$A1 = \{A1_7, \ldots, A1_1, A1_0\}$
$A2 = \{A2_7, \ldots, A2_1, A2_0\}$
$A3 = \{A3_7, \ldots, A3_1, A3_0\}$
$A4 = \{A4_7, \ldots, A4_1, A4_0\}$ Referring to FIG. 2, each DS unit in the DS array 100 includes an adder 110 having a first input end connected to receive X and a second input end connected via a first inverter 120 to receive Y. Further, the DS array 100 includes a second inverter 130 coupled to the carry output of the adder 110, and an XOR (exclusive-OR) gate 140 having a first input end connected to the output of the adder 110 and a second input end connected to the output of the second inverter 130. The output of the second inverter 130 is taken as the output A, while the output of the XOR gate 140 is taken as B. The DS unit operates in such a manner that the input Y is first inverted by the first inverter 120 and then added to X by the adder 110 with an input carry of 1. The output carry from the adder 110 is then inverted by the second inverter 130. the output of the second inverter 130 is then taken as the output A, while the resulting output from the exclusive-OR operation by the XOR gate 140 on the output of the second inverter 130 and the output of the adder 110 is taken as the output B.

Referring back to FIG. 1, the outputted vectors (A1, B1), (A2, B2), (A3, B3), and (A4, B4) from the DS array 100 are transferred first to a register buffer array 199 and then transferred to the compression array 200 which is devised specifically to compress the data of these vectors (A1, B1), (A2, B2), (A3, B3), and (A4, B4) into two output vectors SC and CC (hereinafter referred to as compressed sum vector SC and compressed carry vector CC respectively in this specification) with a reduced number of data bits. These two output vectors SC and CC, in the case of 8-bit coding, are 16-bit vectors which are represented respectively as follows:

$SC = \{S_{15}, S_{14}, \ldots, S_2, S_1, S_0\}$
$CC = \{C_{15}, C_{14}, \ldots, C_2, C_1, C_0\}$ These two output vectors SC and CC are further taken as feedback data to the input stage of the compression array 200.

Figure 3:
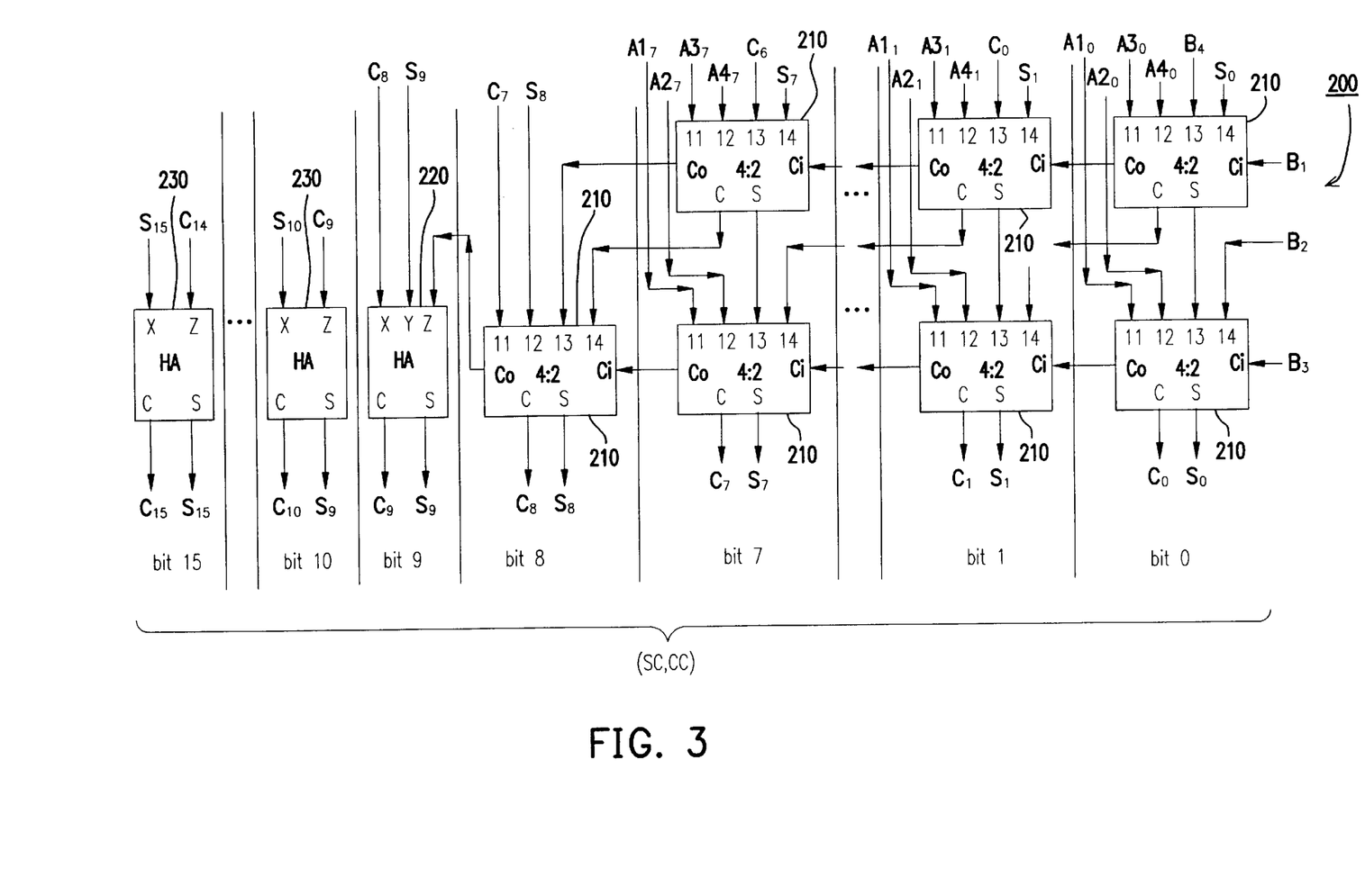
FIG. 3 is a schematic circuit diagram showing the inside structure of the compression array utilized in the block-matching motion estimator of FIG. 1.

Referring to FIG. 3, the compression array 200 includes a set of 4:2 compression units 210, one full-adder (FA) unit 220, and a set of half-adder (HA) units 230 to produce the 16-bit output vectors SC and CC.

Each 4:2 compression unit has four input ports respectively designated by I1, I2, I3, I4, one carry input port $\overline{C}_i$, two output ports respectively designated by C, S, and one carry output port $\overline{C}_o$. The FA unit 220 has three input ports respectively designated by X (addend input), Y (augend input), and Z (carry input), and two output ports respectively designated by S (sum) and C (carry); and each HA units 230 has two input ports respectively designated by X and Y and two output ports respectively designated by S (sum) and C (carry). Both the FA unit 220 and the HA units 230 are well-known digital circuits so details about their inside structures will not be given here in this specification. The inside structure of each of the 4:2 compression units 210 will be disclosed later in this specification with reference to FIG. 4.

As shown in FIG. 3, the bit-0 stage of SC and CC (i.e., $S_0$, $C_0$) is associated with two of the 4:2 compression units 210, which are connected in such a manner that $A1_0$, $A2_0$ are connected respectively to the I1, I2 input ports of the bottom unit; $A3_0$, $A4_0$ are connected respectively to the I1, I2 input ports of the upper unit; B1, B2, B3, B4 are connected respectively to the $\overline{C}_i$ input port of the upper unit, the I4 input port of the bottom unit, the $\overline{C}_i$ input port of the bottom unit, and the I3 input port of the upper unit; $S_0$ is connected to the I4 input port of the upper unit; the $\overline{C}_o$ output port of the upper unit is connected to the $\overline{C}_i$ input port of the upper unit in the next stage; the $\overline{C}_o$ output port of the bottom unit is connected to the $\overline{C}_i$ input port of the bottom unit in the next stage; the S output port of the upper unit is connected to the I3 input port of the bottom unit; and the C output port of the upper unit is connected to the I4 input port of the bottom unit in the next stage. The outputs from the C and S output ports of the bottom 4:2 compression unit in this stage are then taken respectively as the output bits $S_0$, $C_0$.

Further, the bits 1–7 stages of SC and CC (i.e., the bits $S_1$–$S_7$ and $C_1$–$C_7$) are each associated with two of the 4:2 compression units 210. For the bit j stage, $1 \leq j \leq 7$, the associated two 4:2 compression units are connected in such a manner that $A1_j$, $A2_j$ are connected respectively to the I1, I2 input ports of the bottom unit; $A3_j$, $A4_j$ are connected respectively to the I1, I2 input ports of the upper unit; $S_j$ is connected to the I4 input port of the upper unit; $C_{j-1}$ is connected to the I3 input port of the upper unit; the $\overline{C}_o$ output port of the upper unit is connected to the $\overline{C}_i$ input port of the upper unit in the next stage (except for the bit 7 stage); the $\overline{C}_o$ output port of the bottom unit is connected to the $\overline{C}_i$ input port of the bottom unit in the next stage; the S output port of the upper unit is connected to the I3 input port of the bottom unit; and the C output port of the upper unit is connected to the I4 input port of the bottom unit in the next stage. Further, the $\overline{C}_i$ input port of the upper unit is connected to the $\overline{C}_o$ output port of the upper unit in the preceding state, and similarly, the $\overline{C}_i$ input port of the bottom unit is connected to the $\overline{C}_o$ output port of the bottom unit in the preceding state. The outputs from the C and S output ports of the bottom 4:2 compression unit in each stage are then taken as the output bits $S_j$, $C_j$, $1 \leq j \leq 7$.

Still further, the bit-8 stage of SC and CC (i.e., $S_8$, $C_8$) is associated with only one 4:2 compression unit, which is connected in such a manner that $C_7$, $S_8$ are connected respectively to the I1, I2 input ports thereof, the I3 input port thereof is connected to the $\overline{C}_o$ output port of the upper unit in the preceding bit-7 stage; and the I4 input port thereof is connected to the C output port of the upper unit in the preceding bit-7 stage; the $\overline{C}_i$ input port thereof is connected to the $\overline{C}_o$ output port of the bottom unit in the preceding bit-7 stage; and the $\overline{C}_o$ output port thereof is connected to the Z input port of the FA unit in the next bit-9 stage. The outputs from the C and S output ports of the single 4:2 compression unit in this stage are then taken as the output bits $S_8$, $C_8$.

Still further, the bit-9 stage of SC and CC (i.e., $S_9$, $C_9$) is associated with the single FA unit 220, which is connected in such a manner that $C_8$, $S_9$ are connected respectively to the X, Y input ports thereof, while the Z input port thereof is connected to the $\overline{C}_o$ output port of the single 4:2 compression unit in the preceding bit-8 stage. The outputs from the C and S output ports of the FA unit 220 are taken as the output bits $S_8$, $C_8$.

The bit-10 through bit-15 stages are each associated with one single HA unit. As a general rule for the bit-j stage, $10 \leq j \leq 15$, the associated HA unit is connected in such a manner that the X input port thereof is connected to $S_j$, while the Z input port thereof is connected to $C_{j-1}$. The outputs from the C and S output ports of the single HA unit in each stage are then taken as the output bits $S_j$, $C_j$, $10 \leq j \leq 15$.

Figure 4:
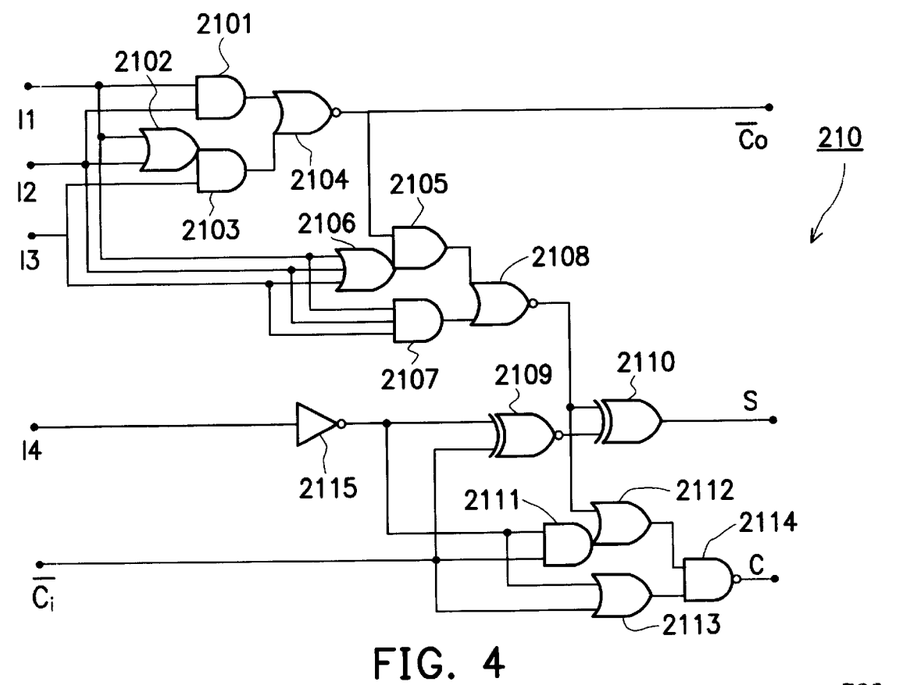
FIG. 4 is a schematic circuit diagram showing the inside logic structure of each 4:2 compression unit utilized in the compression array of FIG. 3.

Referring to FIG. 4, each of the 4:2 compression units 210 shown in FIG. 3 is composed of a first AND gate 2101, a first OR gate 2102, a second AND gate 2103, a first NOR gate 2104, a third AND gate 2105, a second OR gate 2106, a fourth AND gate 2107, a second NOR gate 2108, a first XOR gate 2109, a second XOR gate 2110, a fifth AND gate 2111, a third OR gate 2112, a fourth OR gate 2113, a NAND gate 2114, and an inverter 2115. It is a characteristic part of the invention that this 4:2 compression unit of FIG. 4 includes a total of only 14 logic gates, which is a considerably reduced number as compared to the prior art.

The first AND gate 2101 has a first input end connected to I1 and a second input end connected to I2. The first OR gate 2102 has a first input end connected to I1, and a second input end connected to I2. The second AND gate 2103 has a first input end connected to the output of the first OR gate 2102 and a second input end connected to I3. The first NOR gate 2104 has a first input end connected to the output of the first AND gate 2101 and a second input end connected to the output of the second AND gate 2103. The output of the first NOR gate 2104 is taken as the output $\overline{C}_o$ of the 4:2 compression unit. The third AND gate 2105 has a first input end connected to the output of the first NOR gate 2104 a second input end connected to the output of the second OR gate 2106. The second OR gate 2106 has three input ends connected to receive I1, I2, and I3 respectively. The fourth AND gate 2107 also has three input ends connected to receive I1, I2, and I3 respectively. The second NOR gate 2108 has a first input end connected to the output of the third AND gate 2105 and a second input end connected to the output of the fourth AND gate 2107. The first XOR gate 2109 has a first input end connected via the inverter 2115 to receive an inverted version of I4, and a second input end connected directly to $\overline{C}_i$. The second XOR gate 2110 has a first input end connected to the output of the second NOR gate 2108 and a second input end connected to the output of the first XOR gate 2109. The output of the second XOR gate 2110 is taken as the output S of the 4:2 compression unit. The fifth AND gate 2111 has a first input end connected via the inverter 2115 to receive an inverted version of I4, and a second input end connected directly to $\overline{C}_i$. The third OR gate 2112 has a first input end connected to the output of the second NOR gate 2108 and a second input end connected to the output of the fifth AND gate 2111. The fourth OR gate 2113 has a first input end connected via the inverter 2115 to receive an inverted version of I4, and a second input end connected directly to $\overline{C}_i$. The NAND gate 2114 has a first input end connected to the output of the third OR gate 2112 and a second input end connected to the output of the fourth OR gate 2113. The output of the NAND gate 2114 is taken as the output C of the 4:2 compression unit.

The foregoing 4:2 compression unit is more advantageous than that used in the prior art in that only a total of 14 logic gates are needed, which allows a 25% reduction in the complexity of hardware used to implement the 4:2 compression unit as compared to the prior art.

Figure 5:
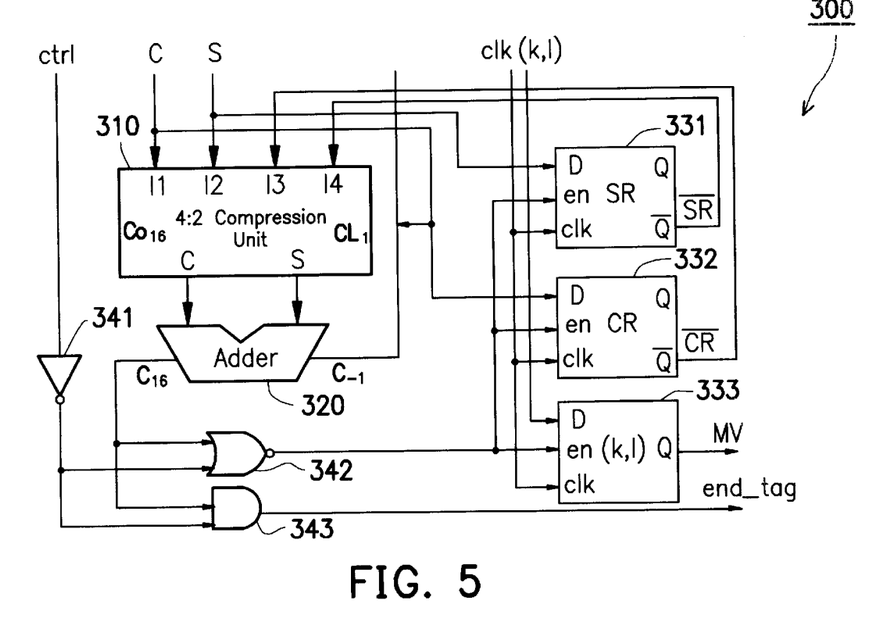
FIG. 5 is a schematic circuit diagram showing the inside structure of the complexity-matching (CM) circuit utilized in the block-matching motion estimator of FIG. 1.

Referring to FIG. 5, the CM unit 300 includes an array of cascaded 4:2 compression units 310, an adder 320, an SR register (D-type flip-flop) 331, a CR register (D-type flip-flop) 332, an MV register (D-type flip-flip) 333, an inverter 341, a NOR gate 342, and an AND gate 343 to produce the desired motion vector MV.

All the SR register 331, the CR register 332, and the MV register 333 are clocked by a clock signal clk. The SR register 331 has a D input port connected to the output compressed sum vector SC from the compression array 200, an en (enable) input port connected to the output of the NOR gate 342, and the inverted output port $\overline{Q}$ (the output data $\overline{SR}$) connected to the I4 input port of the cascaded 4:2 compression array 310. The CR register 332 has a D input port connected to the output compressed carry vector CC from the compression array 200, an en (enable) input port also connected to the output of the NOR gate 342, and the inverted output $\overline{Q}$ (the output data $\overline{CR}$) connected to the I3 input port of the cascaded 4:2 compression array 310. The MV register 333 has a D input port connected to receive (k, 1), an en (enable) input port also connected to the output of the NOR gate 342. The output from the output port Q of the MV register 333 is then taken as the desired motion vector MV. The cascaded 4:2 compression array 310 includes a cascaded array of 16 4:2 compression units, which takes the output vectors SC and CC from the compression array 200 and the two output vectors $\overline{SR}$ and $\overline{CR}$ respectively from the SR register 331 and CR register 332 as input data with an input carry of 1 to thereby produce two 17-bit vectors SP, CP.

The input vectors SC and CC to the cascaded 4:2 compression array 310 are represented as follows:

SC={0, $SC_{15}$, ..., $SC_1$, $SC_0$}
CC={0, $CC_{14}$, ..., $CC_1$, $CC_0$, 0}

The feedback vectors $\overline{SR}$ and $\overline{CR}$ which are input to the cascaded 4:2 compression array 310 are represented as follows:

SR={0, $SR_{15}$, ..., $SR_1$, $SR_0$}
CR={0, $CR_{14}$, ..., $CR_1$, $CR_0$, 0}

The output vectors SP and CP from the cascaded 4:2 compression array 310 are represented as follows.

SP={$SP_{16}$, $SP_{15}$, ..., $SP_1$, $SP_0$}
CP={$CP_{15}$, $CP_{14}$, ..., $CP_0$, 0}

Figure 6:
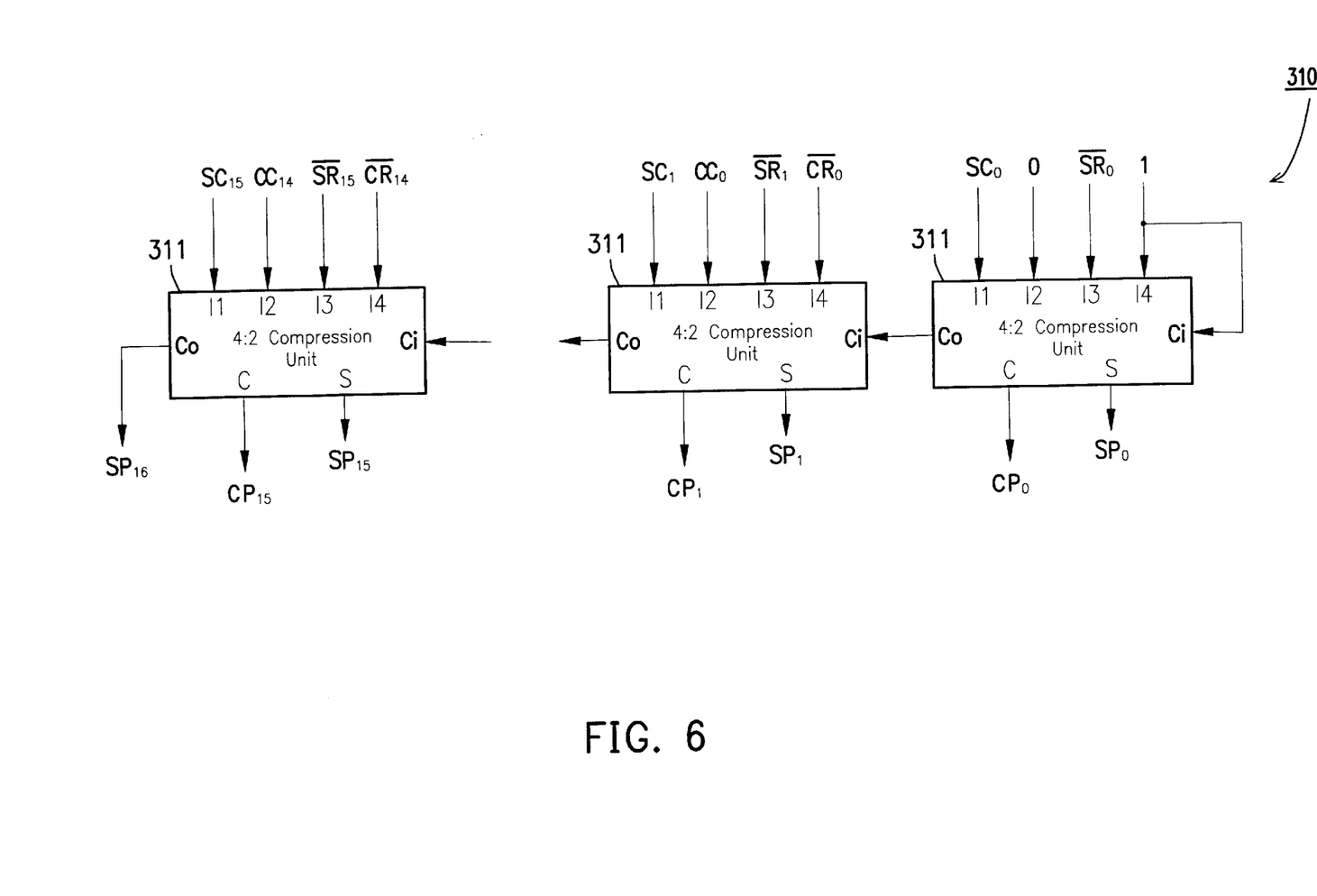
FIG. 6 is a schematic circuit diagram showing the inside structure of each 4:2 compression unit utilized in the CM circuit of FIG. 5.

FIG. 6 shows the inside structure of the cascaded 4:2 compression array 310, which included a cascaded array of 16 4:2 compression units, each having an inside structure as that illustrated in FIG. 4. As shown, the 4:2 compression units in the cascaded array 310 are connected in such a manner that all the I1 ports thereof are connected to receive the 16 bits {$SC_{15}$, $SC_{14}$, ..., $SC_2$, $SC_1$, $SC_0$} respectively; the I2 ports thereof are connected to receive the 16 bits {$CC_{14}$, $CC_{13}$, ..., $CC_1$, $CC_0$, 0} respectively; the I3 ports thereof are connected to receive the 16 bits {$\overline{SR}_{15}$, $\overline{SR}_{14}$, ..., $\overline{SR}_2$, $\overline{SR}_1$, 0} respectively; and the I4 ports thereof are connected to receive the 16 bits {$\overline{CR}_{14}$, $\overline{SR}_{13}$, ..., $\overline{CR}_1$, $\overline{CR}_0$, 1 } respectively. Further, the right-most 4:2 compression unit for generating the least-significant bits $SP_0$ and $CP_0$ is connected in such a manner that its carry input port $\overline{C}_i$ is connected to receive 1 and its carry output port $\overline{C}_o$ is connected to the carry input port $\overline{C}_i$ of the next 4:2 compression unit; each of the intermediate 4:2 compression units for generating the bits $SP_j$ and $CP_j$, $1 \leq j \leq 14$, is connected in such a manner that its carry input port $\overline{C}_i$ is connected to the carry output port $\overline{C}_o$ of the preceding 4:2 compression unit and its carry output port $\overline{C}_o$ is connected to the carry input port $\overline{C}_i$ of the next 4:2 compression unit; and the last 4:2 compression unit for generating the bits $SP_{15}$ and $CP_{15}$ is connected in such a manner that its carry input port $\overline{C}_i$ is connected to the carry output port $\overline{C}_o$ of the preceding 4:2 compression unit and the output from its carry output port $\overline{C}_o$ is taken as the bit $SP_{16}$.

Referring back to FIG. 5, the output vectors SP and CP from the cascaded 4:2 compression array 310 are then fed to the adder 320. By summing up SP and CP, the adder 320 then generates a carry bit $C_{16}$ which is transferred to both the NOR gate 342 and the AND gate 343 both of which have the other input ends concerted via the inverter 341 to the control signal ctrl.

The control signal ctrl controls the operation of the CM unit 300 in such a manner that, when ctrl=1, it indicates that the current block-matching procedure is normally completed. At this time, if $C_{16}$=0, it indicates that the MAE value of the current block is less than the minimum MAE value (min MAE). The condition of ctrl=1 and $C_{16}$=0 will then enable the SR register 331 and the CR register 332 to receive and store the SC and CC vector values of the current MAE(k, 1) so as to refresh the value of min MAE stored therein, and meanwhile enable the MV register 333 to receive and store the current value of (k, 1) so as to refresh the current MV value stored therein.

On the other hand, when ctrl=0, it indicates that the current block-matching procedure is not yet completed. At this time, if $C_{16}$=1, it indicates that the sum value is exceeding min MAE. The condition of ctrl=0 and $C_{16}$=1 will then cause the AND gate 343 to output 1 (i.e., setting end tag=1), which will then cause the block-matching motion estimator to terminate the current BM computation step and proceeds to the next. In this manner, the adaptive block-matching motion estimator of the invention keeps performing the ABM algorithm.

In the case of N=16 and 8-bit coded intensity levels for the pixel data, the maximum value of MAE is 65280, which can be represented by a total of 17 bits. Compared to the conventional accumulation tree architecture, the adaptive block-matching motion estimator of the invention requires, in the case of four-channel systems ($N_{ch}$=4), the use of only 3 pipeline stages, which considerably reduces the hardware complexity of the motion estimator of the invention as compared to the total of 5 pipeline stages in the conventional accumulation tree architecture. Moreover, compared to the conventional FSA and HSA methods, the invention also provides a considerably reduced latency time, which allows an increased performance for the overall video coding system. Furthermore, the invention is highly suitable for VLSI implementation in that the constituent elements in the compression array are quite regularly arranged, so that the layout therefor is easy to carry out. The burden involved in the computation for block matching can be reduced to 45% as compared to AFSA and to 23% as compared to ATSSA. When N and $N_{ch}$ are further increased, these benefits will be even more apparent.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An adaptive block-matching motion estimator for use on a video coding system to process a set of pixel data from the blocks of each video frame in a video signal so as to produce a motion vector indicative of a shift between the current frame and a compared frame, said adaptive block-matching motion estimator comprising:

a DS (data-substraction) array including a plurality of DS units for processing the pixel data of the current image block and the pixel data of the compared image block to thereby obtain a difference vector and a set of weight bits;

a compression array coupled to said DS array, said compression array having a first output port for outputting a compressed sum vector and a second output port for outputting an associated compressed carry vector, with the difference vector and the set of weight bits from said DS array along with the compressed sum vector and the associated compressed carry vector being taken as the inputs to said compression array; and a CM (complexity-matching) unit, coupled to said compression array, for processing the compressed sum vector and the associated compressed carry vector from said compression array to thereby produce the desired motion vector.

2. The adaptive block-matching motion estimator of claim 1, wherein each DS unit in said DS array comprises:

a first inverter for inverting the pixel data of the compared image block;

an adder having an addend input port connected to the pixel data of the current image block, an augend input port connected to the inverted pixel data of the compared image block from said first inverter, and an input carry connected to receive a bit 1;

a second inverter coupled to receive the output carry of said adder; and an XOR gate having a first input end connected to the sum output port of said adder and a second input end connected to the output of said second inverter;

wherein
      the output of said second inverter is taken as one bit of the output difference vector from said DS array; and
      the output of said XOR gate is taken as one of the output weight bits from said DS array.

3. The adaptive block-matching motion estimator of claim 1, wherein said compression array in the case of a four-channel system comprises:

4:2 compression means for producing a lower portion of the compressed sum vector and the compressed carry vector;

a full-adder unit for producing a middle portion of the compressed sum vector and the compressed carry vector; and a set of half-adder units for producing an upper portion of the compressed sum vector and the compressed carry vector.

4. The adaptive block-matching motion estimator of claim 3, wherein said 4:2 compression means comprises a plurality of 4:2 compression units, each including a total of 14 logic gates having four input ports, an input carry port, an output carry port, and a first output port for outputting one bit of the compressed sum vector, and a second output port for outputting one bit of the compressed carry vector.

5. The adaptive block-matching motion estimator of claim 4, wherein said 14 logic gates consists of:

a first AND gate having a first input end connected to a first input port of said 4:2 compression unit, and a second input end connected to a second input port of said 4:2 compression unit;

a first OR gate having a first input end connected to the first input port of said 4:2 compression unit, and a second input end connected to the second input port of said 4:2 compression unit;

a second AND gate having a first input end connected to the output of said first OR gate, and a second input end connected to a third input port of said 4:2 compression unit;

a first NOR gate having a first input end connected to the output of said first AND gate, a second input end connected to the output of said second AND gate, and an output end being taken as the output carry of said 4:2 compression unit;

a second OR gate having three input ends connected respectively to the first input port of said 4:2 compression unit, the second input port of said 4:2 compression unit, and the third input port of said 4:2 compression unit;

a third AND gate having a first input end connected to the output of said first NOR gate, a second input end connected to the output of said second OR gate;

a fourth AND gate having three input ends connected respectively to the first input port of said 4:2 compression unit, the second input port of said 4:2 compression unit, and the third input port of said 4:2 compression unit;

a second NOR gate having a first input end connected to the output of said third AND gate, and a second input end connected to the output of said fourth AND gate;

a fourth XOR gate having a first input end connected via inverter to a fourth input port of said 4:2 compression unit, and a second input end connected to receive the input carry;

a second XOR gate having a first input end connected to the output of said second NOR gate, and a second input end connected to the output of said first XOR gate, and an output end being taken as the output of the one bit of the compressed sum vector associated with said 4:2 compression unit;

a fifth AND gate having a first input end connected via said inverter to the fourth input port of said 4:2 compression unit, and a second input end connected to receive the input carry;

a third OR gate having a first input end connected to the output of said second NOR gate, and a second input end connected to the output of said fifth AND gate;

a fourth OR gate having a first input end connected via said inverter to the fourth input port of said 4:2 compression unit, and a second input end connected to receive the input carry; and a NAND gate having a first input end connected to the output of said third OR gate, a second input end connected to the output of said fourth OR gate, and an output end being taken as the output of the one bit of the compressed carry vector associated with said 4:2 compression unit.

6. The adaptive block-matching motion estimator of claim 1, wherein said CM unit comprises:

a cascaded array of 4:2 compression units which takes the compressed sum vector and the compressed carry vector from said DS array and a latched and inverted version of the same as four inputs with an input carry 1 to thereby produce two compressed outputs;

an adder coupled to said cascaded 4:2 compression array, which takes the two compressed outputs from said cascaded 4:2 compression array as inputs with an input carry 1 to thereby produce an output carry;

a first register for latching the compressed sum vector from said compression array and outputting an inverted version of the compressed sum vector to said cascaded 4:2 compression array, a second register for latching the compressed carry vector from said compression array and outputting an inverted version of the compressed carry vector to said cascaded 4:2 compression array, a motion vector register for latching and outputting the currently obtained shift of the compared image block with respect to the original one; and control means for controlling the operations of said first register, said second register, and said motion vector register by using a control signal in conjunction with the output carry from said adder.

7. The adaptive block-matching motion estimator of claim 4, wherein each 4:2 compression unit in said cascaded 4:2 compression array comprises a total of 14 logic gates having four input ports, an input carry port, an output carry port, and a first output port for outputting one bit of the compressed sum vector, and a second output port for outputting one bit of the compressed carry vector.

8. The adaptive block-matching motion estimator of claim 7, wherein said 14 logic gates consists of:

a first AND gate having a first input end connected to a first input port of said 4:2 compression unit, and a second input end connected to a second input port of said 4:2 compression unit;

a first OR gate having a first input end connected to the first input port of said 4:2 compression unit, and a second input end connected to the second input port of said 4:2 compression unit;

a second AND gate having a first input end connected to the output of said first OR gate, and a second input end connected to a third input port of said 4:2 compression unit;

a first NOR gate having a first input end connected to the output of said first AND gate, a second input end connected to the output of said second AND gate, and an output end being taken as the output carry of said 4:2 compression unit;

a second OR gate having three input ends connected respectively to the first input port of said 4:2 compression unit, the second input port of said 4:2 compression unit, and the third input port of said 4:2 compression unit;

a third AND gate having a first input end connected to the output of said first NOR gate, second input end connected to the output of said second OR gate;

a forth AND gate having three input ends connected respectively to the first input port of said 4:2 compression unit, the second input port of said 4:2 compression unit, and the third input port of said 4:2 compression unit;

a second NOR gate having a first input end connected to the output of said third AND gate, and a second input end connected to the output of said fourth AND gate;

a fourth XOR gate having a first input end connected via an inverter to a fourth input port of said 4:2 compression unit, and a second input end connected to receive the input carry;

a second XOR gate having a first input end connected to the output of said second NOR gate, and a second input end connected to the output of said first XOR gate, and an output end being taken as the output of the one bit of the compressed sum vector associated with said 4:2 compression unit;

a fifth AND gate having a first input end connected via said inverter to the fourth input port of said 4:2 compression unit, and a second input end connected to receive the input carry;

a third OR gate having a first input end connected to the output of said second NOR gate, and a second input end connected to the output of said fifth AND gate;

a fourth OR gate having a first input end connected via said inverter to the fourth input port of said 4:2 compression unit, and a second input end connected to receive the input carry; and a NAND gate having a first input end connected to the output of said third OR gate, a second input end connected to the output of said fourth OR gate, and an output end being taken as the output of the one bit of the compressed carry vector associated with said 4:2 compression unit.

* * * * *